US008284275B2

(12) United States Patent
Abe

(10) Patent No.: US 8,284,275 B2
(45) Date of Patent: Oct. 9, 2012

(54) LENS BARREL AND IMAGING APPARATUS

(75) Inventor: Takashi Abe, Ehime (JP)

(73) Assignee: Panasonic Corporation, Osaka (JP)

(*) Notice: Subject to any disclaimer, the term of this patent is extended or adjusted under 35 U.S.C. 154(b) by 327 days.

(21) Appl. No.: 12/555,935

(22) Filed: Sep. 9, 2009

(65) Prior Publication Data

US 2010/0066864 A1  Mar. 18, 2010

(30) Foreign Application Priority Data

Sep. 11, 2008  (JP) ................................ 2008-233199

(51) Int. Cl.
*H04N 5/262* (2006.01)
*H04N 5/228* (2006.01)
*G03B 13/00* (2006.01)

(52) U.S. Cl. ............... 348/240.99; 348/345; 348/208.11

(58) Field of Classification Search ........................ None
See application file for complete search history.

(56) References Cited

U.S. PATENT DOCUMENTS

| 5,761,560 A | 6/1998 | Miyazawa et al. |
| 5,973,857 A * | 10/1999 | Kaneda ........................ 359/701 |
| 2008/0187302 A1 * | 8/2008 | Okawara ........................ 396/80 |

FOREIGN PATENT DOCUMENTS

| JP | 4-350611 A | 12/1992 |
| JP | 6-153049 A | 5/1994 |
| JP | 6-217181 A | 8/1994 |
| JP | 7-294796 A | 11/1995 |
| JP | 8-286096 A | 11/1996 |
| JP | 9-113789 A | 5/1997 |
| JP | 9-243899 A | 9/1997 |
| JP | 2000-292679 A | 10/2000 |
| JP | 2001-83396 A | 3/2001 |

* cited by examiner

*Primary Examiner* — Nhan T Tran
*Assistant Examiner* — Yih-Sien Kao
(74) *Attorney, Agent, or Firm* — Panasonic Patent Center

(57) ABSTRACT

A lens barrel includes a correction lens to move along an optical axis to perform zoom tracking, a correction lens driver to drive the correction lens, a zoom lens, a zoom ring to be turned by a user, a zoom lens driver to mechanically move the zoom lens according to an amount of turn of the zoom ring, a position detector to detect a position of the zoom lens, a rate detector to detect a change rate of the position of the zoom lens, a storage unit to store relational information which associates the position of the zoom lens with a focus position of the correction lens, and a controller to control the correction lens driver. The controller determines a focus position of the correction lens corresponding to a position more distant by a predetermined amount from the position of the zoom lens detected by the position detector, by referring to the relational information, and controls the correction lens driver to drive the correction lens with a target position set to the determined focus position. The predetermined amount is changed according to the change rate of the position of the zoom lens detected by the rate detector.

15 Claims, 6 Drawing Sheets

Fig. 6A
WHEN ZOOM LENS IS STOPPED

Fig. 6B
WHEN ZOOM LENS IS DRIVEN

LENS BARREL AND IMAGING APPARATUS

BACKGROUND

1. Technical Field

The technical field relates to an imaging apparatus such as a digital still camera, and a lens barrel mountable to the imaging apparatus.

2. Related Art

JP-A-6-153049 discloses an autofocus apparatus capable of performing zoom tracking in response to a manual zoom operation performed by a user. The autofocus apparatus stores in advance a plurality of zoom tracking curves. The autofocus apparatus can control the position of a zoom lens in a stepwise manner. Moreover, the autofocus apparatus determines a position to which the zoom lens is moved, based on a manual zoom operation performed by the user. The autofocus apparatus then selects one zoom tracking curve based on information about the determined position to which the zoom lens is moved. It is noted that the zoom tracking is an operation to keep a focus even if zoom operation is done after the autofocus apparatus comes into focus by moving the focus lens.

In this manner, the autofocus apparatus can prevent an erroneous selection of the zoom tracking curve, particularly resulting in rapid focus control upon zooming operation.

However, the autofocus apparatus described in JP-A-6-153049 can be applied only to a zoom tracking operation in which the zoom lens is electrically driven by a power zoom, and does not support a zoom tracking operation in when the user manually operates the zoom lens.

Generally, in a zoom tracking operation, when a zoom magnification is changed in a focus state, a focus lens or correction lens is driven according to a zoom tracking curve to keep the focus state. At that time, a control target position of the focus lens or correction lens is determined based on the current position of the zoom lens, along the zoom tracking curve. In cases where the focus lens or correction lens is driven based on the current position of the zoom lens, the zoom lens has already moved to another position and thus a focus state cannot be obtained when the focus lens or correction lens reaches the control target position. Hence, it is necessary to determine a control target position of the focus lens or correction lens by also taking into account the moving speed of the zoom lens.

Specifically, in the case of a power zoom in which the zoom lens is driven by a motor, the zoom speed is constant and thus a control target position of the focus lens or correction lens is determined by adding a constant value based on the zoom speed. In this case, a determination of a control target position is easy. However, in the case of manually performing a zoom operation by the user, the speed of turning a zoom ring by the user is not constant. Therefore, a determination of the control target position of the focus lens or correction lens is not easy.

SUMMARY

In order to solve the above-mentioned problems, there is provided a lens barrel capable of performing relatively accurate zoom tracking regardless of the speed of zooming operation when a zoom lens is mechanically driven by a manual zoom.

In a first aspect, a lens barrel is provided, which includes a correction lens operable to move along an optical axis to perform zoom tracking, a correction lens driver operable to drive the correction lens, a zoom lens, a zoom ring operable to be turned by a user, a zoom lens driver operable to mechanically move the zoom lens according to an amount of turn of the zoom ring, a position detector operable to detect a position of the zoom lens, a rate detector operable to detect a change rate of the position of the zoom lens, a storage unit operable to store relational information which associates the position of the zoom lens with a focus position of the correction lens, and a controller operable to control the correction lens driver. The controller determines a focus position of the correction lens corresponding to a position more distant by a predetermined amount from the position of the zoom lens detected by the position detector, by referring to the relational information, and controls the correction lens driver to drive the correction lens with a target position set to the determined focus position. The controller changes the predetermined amount according to the change rate of the position of the zoom lens detected by the rate detector.

In a second aspect, an imaging apparatus including an interchangeable lens and a camera body to which the interchangeable lens is mountable is provided. The interchangeable lens includes the interchangeable lens includes a correction lens operable to move along an optical axis to perform zoom tracking, a correction lens driver operable to drive the correction lens, a zoom lens, a zoom ring operable to be turned bay a user, a zoom lens driver operable to mechanically move the zoom lens according to an amount of turn of the zoom ring, a position detector operable to detect a position of the zoom lens, a rate detector operable to detect a change rate of the position of the zoom lens, a storage unit operable to store relational information which associates the position of the zoom lens with a focus position of the correction lens, and a controller operable to control the correction lens driver. The controller determines a focus position of the correction lens corresponding to a position more distant by a predetermined amount from the position of the zoom lens detected by the position detector, by referring to the relational information, and controls the correction lens driver to drive the correction lens with a target position set to the determined focus position, and the controller changes the predetermined amount according to the change rate of the position of the zoom lens detected by the rate detector. The camera body includes an imaging unit operable to generate image data of a subject image captured through the interchangeable lens, and a recording unit operable to perform a predetermined process on the image data and store the image subjected to the predetermined process in a recording medium.

In a third aspect, another imaging apparatus is provided. The imaging apparatus includes a correction lens operable to move along an optical axis for zoom tracking, a correction lens driver operable to drive the correction lens, a controller operable to control the correction lens driver, a zoom lens, a zoom ring operable to be turned by a user, a zoom lens driver operable to mechanically move the zoom lens according to an amount of turn of the zoom ring, a position detector operable to detect a position of the zoom lens, a rate detector operable to detect a change rate of the position of the zoom lens, a storage unit operable to store relational information which associates the position of the zoom lens with a focus position of the correction lens, an imaging unit operable to generate image data of a subject image captured through the interchangeable lens, and a recording unit operable to perform a predetermined process on the image data and store the image subjected to the predetermined process in a recording medium. The controller determines a focus position of the correction lens corresponding to a position more distant by a predetermined amount from the position of the zoom lens detected by the position detector, by referring to the relational information, and controls the correction lens driver to drive the correction lens with a target position set to the determined focus position. The controller changes the predetermined amount according to the change rate of the position of the zoom lens detected by the rate detector.

According to the above-described aspects, a lens barrel capable of performing accurate zoom tracking regardless of the speed of zooming operation when a zoom lens is driven by a manual operation at any speed, and an imaging apparatus using the same can be provided.

BRIEF DESCRIPTION OF DRAWINGS

FIGS. 6A and 6B are diagrams for describing drive control of the focus lens when a zoom tracking operation is performed.

DETAIL DESCRIPTION OF PREFERRED EMBODIMENT

Preferred embodiments will be described with reference to the accompanying drawings.

1. First Embodiment 1-1. Outline

Figure 1:
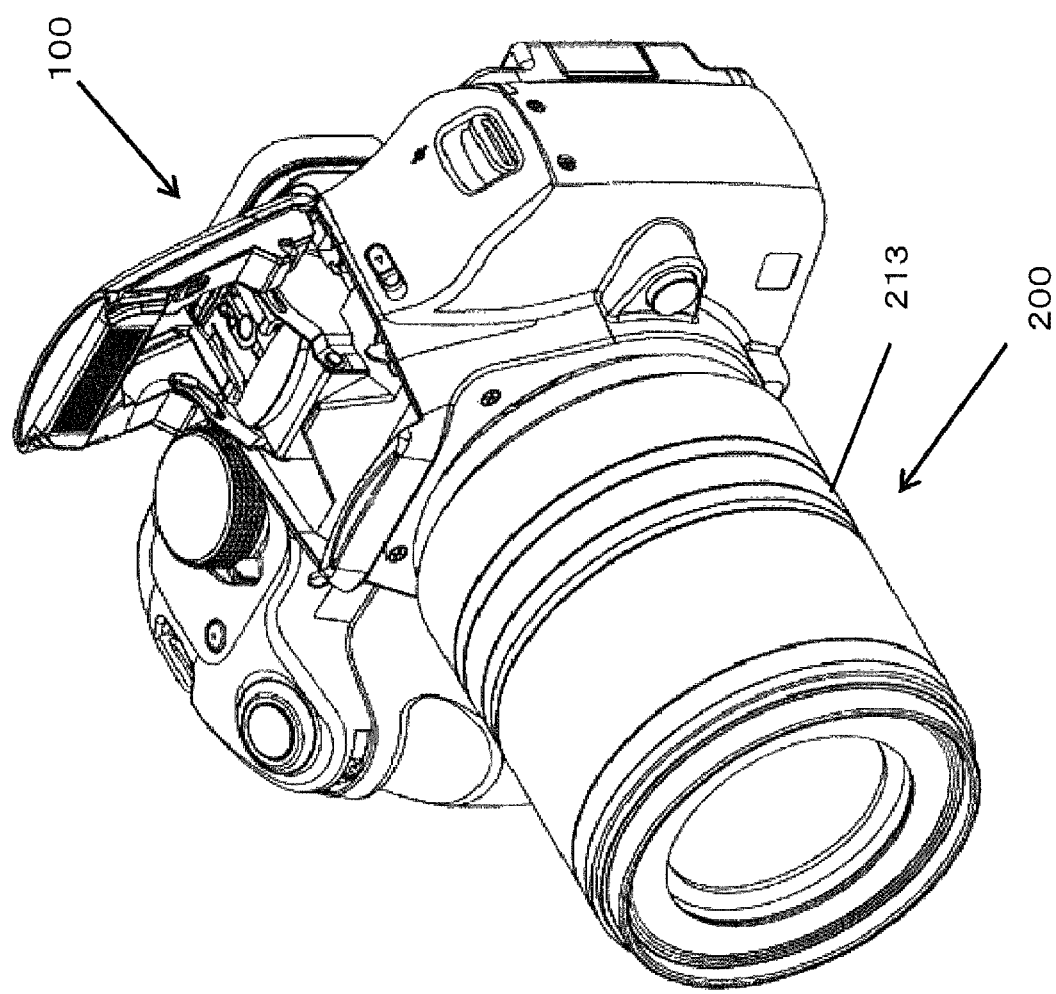
FIG. 1 is a perspective view of a camera system according to a first embodiment.

FIG. 1 is a perspective view of a camera system according to the present embodiment. As shown in FIG. 1, the camera system 1 includes a camera body 100 and an interchangeable lens 200. The interchangeable lens 200 is provided with a zoom ring 213. A user can manually perform a zoom operation by turning the zoom ring 213.

The embodiment described below is made to provide a lens barrel capable of performing relatively rapid focus control upon zoom operation in the lens barrel capable of performing the manual zoom operation.

1-2. Configuration

Figure 2:
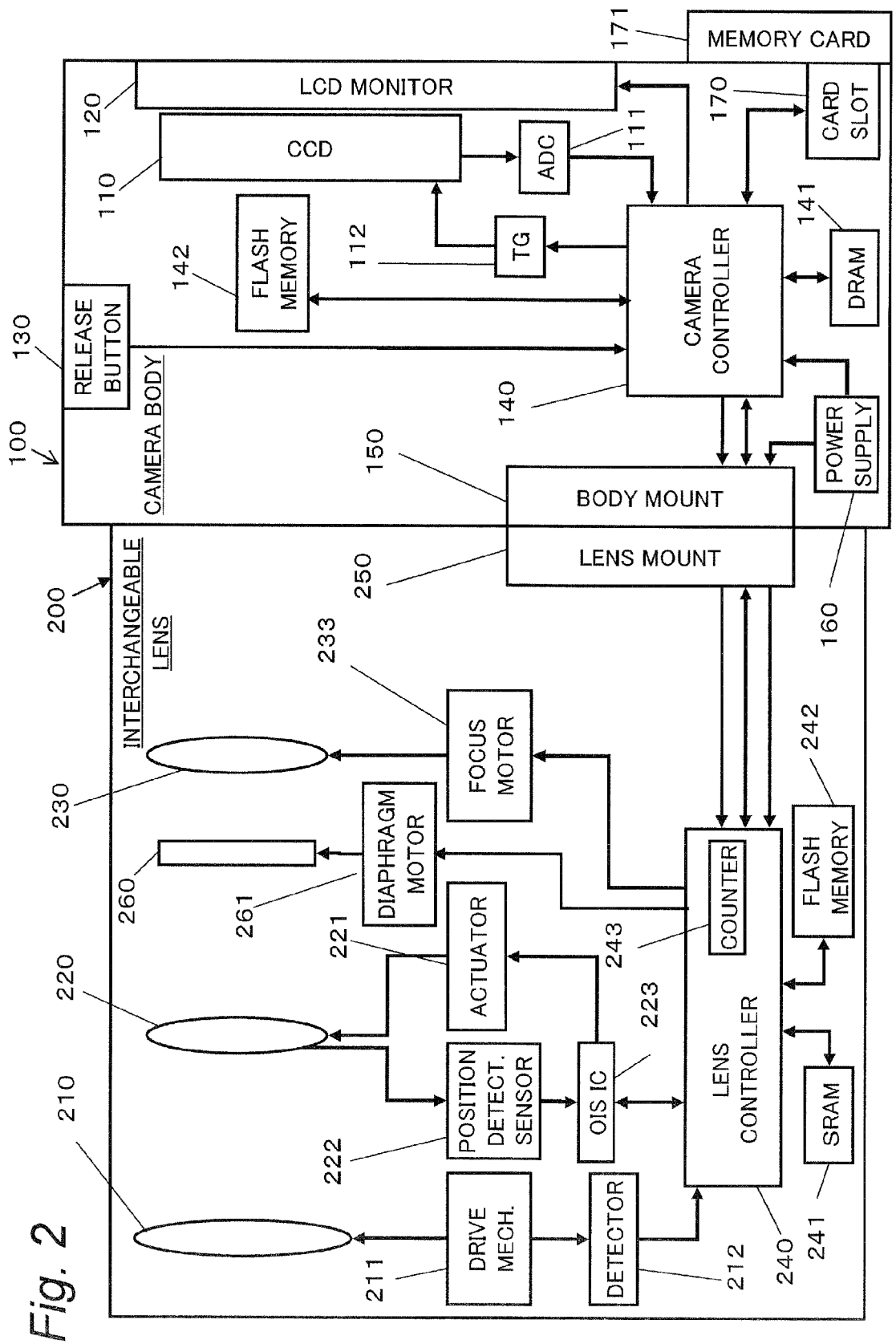
FIG. 2 is a block diagram of the camera system according to the first embodiment.

FIG. 2 is a block diagram of the camera system 1. A configuration of the camera system 1 according to the present embodiment will be described with reference to FIG. 2.

1-2-1. Configuration of the Camera Body

The camera body 100 includes a CCD image sensor 110, a liquid crystal device (LCD) monitor 120, a camera controller 140, a body mount 150, a power supply 160, and a card slot 170.

The camera controller 140 controls the entire camera system 1, including control of the CCD image sensor 110, and the like, according to an instruction provided from an operating member such as a release button 130. The camera controller 140 sends a vertical synchronizing signal to a timing generator 112. In parallel with this, the camera controller 140 generates an exposure synchronizing signal based on the vertical synchronizing signal and periodically sends the generated exposure synchronizing signal to a lens controller 240 through the body mount 150 and a lens mount 250. The camera controller 140 uses a DRAM 141 as a work memory for a control operation or image processing operation.

The CCD image sensor 110 captures a subject image incident thereon through the interchangeable lens 200 and generates an analog image signal. The generated analog image signal is converted to digital image data by an AD converter 111. The image data converted by the AD converter 111 is subjected to various image processing by the camera controller 140. The various image processing includes, for example, a gamma correction process, a white balance correction process, a flaw correction process, a YC conversion process, an electronic zoom process, and an image compression process such as a JPEG compression process.

The CCD image sensor 110 operates at a timing controlled by the timing generator 112. The operations of the CCD image sensor 110 include a still image capturing operation, a moving image capturing operation, a through image capturing operation, and the like. The through image is an image that is not recorded in a memory card 171 after it is captured. The through image is mainly a moving image and is displayed on the LCD monitor 120 to be used for determination of a composition for capturing a still image.

The LCD monitor 120 displays an image represented by display image data subjected to image processing controller 140. The LCD monitor 120 can selectively display a moving image or a still image.

The card slot 170 can be loaded with the memory card 171. The card slot 170 controls the memory card 171 under control of the camera controller 140. Specifically, image data generated by image processing of the camera controller 140 is stored in the memory card 171. The memory card 171 can store various types of image files, for example, JPEG image file. Moreover, image data or image files stored in the memory card 171 can be read from the memory card 171. Image data or an image file read from the memory card 171 is subjected to image processing by the camera controller 140. For example, the camera controller 140 decompresses image data or an image file obtained from the memory card 171 to generate image data to be displayed.

The power supply 160 supplies power to be consumed in the camera system 1. The power supply 160 may be, for example, a dry battery or rechargeable battery. Alternatively, the power supply 160 may supply the camera system 1 with power supplied from an external source through a power cord.

The body mount 150 can be mechanically and electrically connected to the lens mount 250 of the interchangeable lens 200. The body mount 150 can send and receive data to and from the interchangeable lens 200 through the lens mount 250. The body mount 150 sends an exposure synchronizing signal received from the camera controller 140 to the lens controller 240 through the lens mount 250. The body mount 150 sends the other control signals received from the camera controller 140 to the lens controller 240 through the lens mount 250. Moreover, the body mount 150 sends a signal received from the lens controller 240 through the lens mount 250 to the camera controller 140.

1-2-2. Lens Barrel 1-2-2-1. Configuration of the Interchangeable Lens

The interchangeable lens 200 includes an optical system, the lens controller 240, and the lens mount 250. The optical system of the interchangeable lens 200 includes a zoom lens 210, an OIS lens 220, a diaphragm 260, and a focus lens 230.

The zoom lens 210 is a lens for changing a magnification of a subject image formed by the optical system of the interchangeable lens 200. The zoom lens 210 includes one or a plurality of lenses. A drive mechanism 211 includes the zoom ring 213 operable by the user, and the like, and informs the zoom lens 210 of an operation performed by the user so that the zoom lens 210 is moved in an optical direction of the optical system. A detector 212 detects an amount of drive of the drive mechanism 211. The detector 212 also detects a position of the zoom ring 213, i.e., a position of the zoom lens 210 in a method described later. The lens controller 240 can recognize the zoom magnification of the optical system and the position, amount of turn, and turn speed of the zoom ring 213, by obtaining detection results from the detector 212.

The OIS lens 220 is a lens for correcting a blur of a subject image formed by the optical system of the interchangeable lens 200. The OIS lens 220 reduces a blur of a subject image on the CCD image sensor 110 by moving in a direction to cancel a shake of the camera system 1. The OIS lens 220 includes one or a plurality of lenses. An actuator 221 drives the OIS lens 220 in a plane perpendicular to the optical axis of the optical system under control of an OIS IC 223. The actuator 221 can be implemented by, for example, a magnet and a planar coil. A position detection sensor 222 is a sensor that detects a position of the OIS lens 220 on the plane perpendicular to the optical axis of the optical system. The position detection sensor 222 can be implemented by, for example, a magnet and a Hall element. The OIS IC 223 controls the actuator 221 based on a detection result of the position detection sensor 222 and a detection result of a shake sensor such as a gyro sensor. The OIS IC 223 obtains a detection result of the shake sensor from the lens controller 240. In addition, the OIS IC 223 sends a signal indicating a state of an optical image blur correction process to the lens controller 240.

The diaphragm 260 is a member for regulating the amount of light passing through the optical system. The diaphragm 260 includes, for example, a plurality of diaphragm blades and can regulate the amount of light by opening and closing an opening formed by the blades. An iris motor 261 is drive means for opening and closing the opening of the diaphragm 260.

The focus lens 230 is a lens for changing the focus state of a subject image formed on the CCD image sensor 110 by the optical system. The focus lens 230 includes one or a plurality of lenses.

A focus motor 233 drives the focus lens 230 to move the focus lens 230 back and forth along the optical axis of the optical system under control of the lens controller 240. In this manner, the focus state of a subject image formed on the CCD image sensor 110 by the optical system can be changed. In the present embodiment, a stepping motor is used as the focus motor 233. However, the focus motor 233 is not limited thereto but may be, for example, a DC motor or ultrasonic motor.

The lens controller 240 controls the entire interchangeable lens 200, including control of the OIS IC 223 and the focus motor 233, based on control signals from the camera controller 140. For example, the lens controller 240 controls the focus motor 233 to move the focus lens 230 back and forth along the optical axis in a predetermined drive method, based on a control signal from the camera controller 140. The lens controller 240 also receives signals from the detector 212, the OIS IC 223, and the like, and sends the signals to the camera controller 140. The lens controller 240 sends and receives data to and from the camera controller 140 through the lens mount 250 and the body mount 150.

The lens controller 240 uses a DRAM 241 as a work memory. A flash memory 242 stores a program and parameters used for control performed by the lens controller 240. For example, the flash memory 242 stores information about a relationship between the position of the zoom lens 210 and the focus position of the focus lens 230 such as that shown in FIG. 4 described later, and the like.

1-2-2-2. Method for Detecting Turn Speed of Zoom Ring

Figure 3:
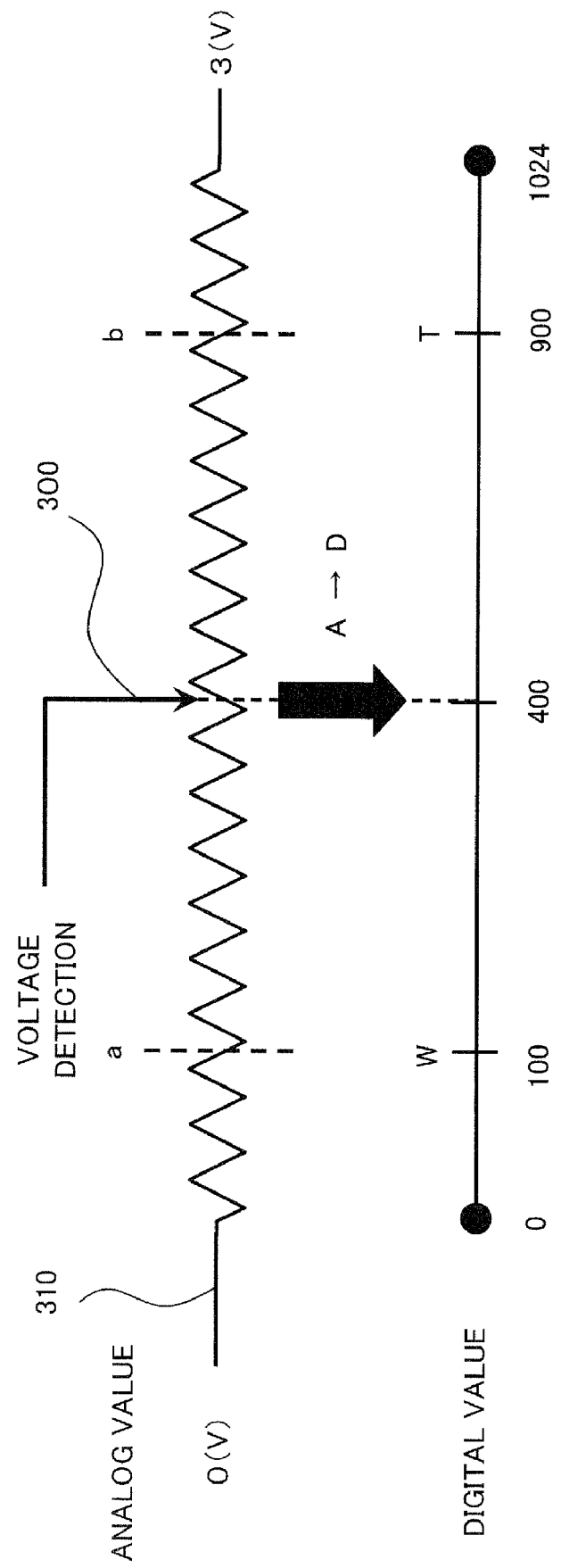
FIG. 3 is a diagram for describing a method for detecting a turn speed of a zoom ring.

A method for detecting a turn speed of the zoom ring 213 will be described with reference to FIG. 3. FIG. 3 is a diagram for describing the configuration and function of the zoom ring 213.

The zoom ring 213 has, inside thereof, a slider 300, a resistor 310, and a cam groove which defines a path along which the slider 300 moves. When the zoom ring 213 is turned by the user, the slider 300 can move along the cam groove in a range of positions a and b, while electrically contacting with the resistor 310. A voltage of 3.0 (V) is being applied across the resistor 310. A voltage based on the position of the slider 300 on the resistor 310 is obtained from the slider 300. That is, a voltage based on the position of the zoom ring 213 (i.e., the position of the zoom lens 210) is obtained from the slider 300. Thus, the detector 212 can detect a position of the zoom ring 213 (i.e., a position of the zoom lens 210) as analog data by measuring a voltage of the slider 300.

The lens controller 240 inputs as input a voltage detected by the detector 212 every predetermined period of time and processes digital data obtained by AD-converting the inputted voltage, thereby detecting a turn speed of the zoom ring 213. The lens controller 240 provides 10 bits to detect a turn speed of the zoom ring 213. In an example in FIG. 3, a digital value corresponding to an analog voltage value detected from the slider 300 at the position a is 100 and a digital value corresponding to an analog voltage value detected from the slider 300 at the position b is 900. When a voltage measured by the slider 300 is 1.17 (V), the digital data corresponding to the voltage is 400. The unit of digital data after conversion is hereinafter referred to as "AD".

By thus detecting an amount of change, per unit of time, in digital data of a position of the zoom ring 213 which is detected by the detector 212, the lens controller 240 can detect a turn speed of the zoom ring 213. It should be noted that although in the camera system 1 according to the present embodiment a turn speed of the zoom ring 213 is calculated by detecting an amount of change per unit of time in the position of the zoom ring 213 (i.e., the position of the zoom lens 210), the configuration does not necessarily need to be the one described above. For example, a turn speed of the zoom ring 213 may be directly detected.

1-2-2-3. Relationship Between Zoom Lens Position and Focus Lens Position

Figure 4:
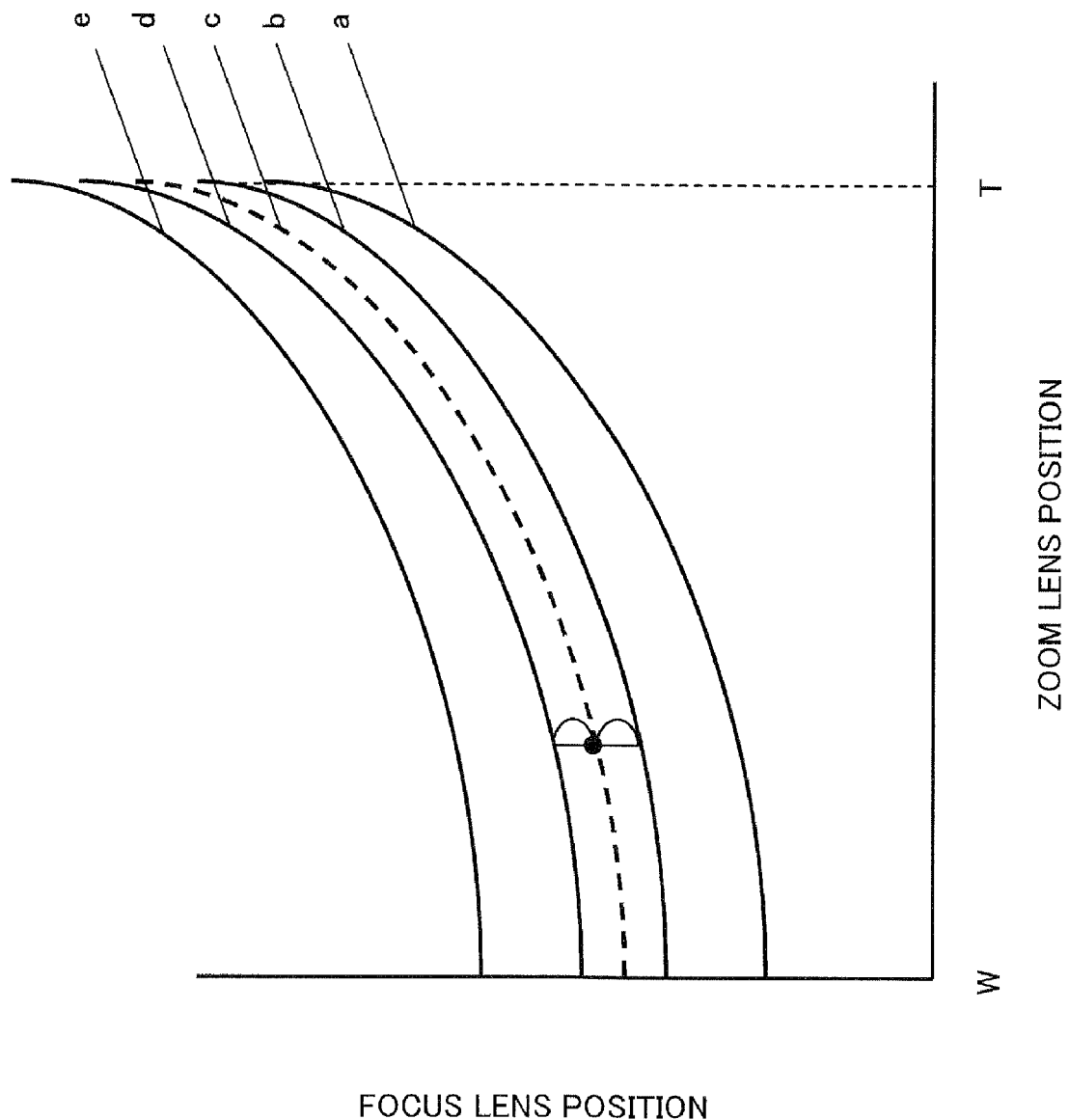
FIG. 4 is a diagram (zoom tracking curve) for describing a relationship between a position of a zoom lens and a focus position of a focus lens.

A relationship between the position of the zoom lens 210 and the focus position of the focus lens 230 will be described with reference to FIG. 4. FIG. 4 is a schematic diagram for describing a relationship between the position of the zoom lens 210 and the focus position of the focus lens 230.

The flash memory 242 stores relational information indicating a relationship between the position of the zoom lens 210 and the focus position of the focus lens 230, such as that shown in FIG. 4. The relational information includes a plurality of zoom tracking curves for respective distances to a subject (subject distances). In an example in FIG. 4, the relational information includes four zoom tracking curves a, b, d, and e.

When the zoom lens 210 is driven in a focus state, the focus state is changed to an out-of-focus state on the CCD image sensor 110 if the focus lens 230 is left stopped. Hence, in the camera system 1 according to the present embodiment, upon driving the zoom lens 210 in a focus state, a zoom tracking curve associated with a subject distance is selected and the focus lens 230 is driven along the zoom tracking curve as the position of the zoom lens 210 changes. In this manner, even when the zoom lens 210 is driven, an image can be continuously captured with the focus state being maintained.

When a zoom tracking curve associated with a desired subject distance is not stored in the flash memory 242, a position of the focus lens 230 for the desired subject distance is determined from zoom tracking curves for two subject distances close to the desired subject distance. For example, when the desired subject distance is between a subject distance associated with a zoom tracking curve b and a subject distance associated with a zoom tracking curve d, a virtual zoom tracking curve c is determined by interpolation from the zoom tracking curve b and the zoom tracking curve d. The focus lens 230 is driven along the virtual curve c. In this manner, even when a zoom tracking curve for a concerned subject distance is not stored in the flash memory 242, a zoom tracking operation can be performed for any subject distance, enabling a zoom operation with a focus state being maintained.

1-2-3. Term Correspondence

The focus lens 230 is an example of a correction lens. The focus motor 233 is an example of a correction lens driver. A configuration including the slider 300, the resistor 300, and the lens controller 240 is an example of a position detector. The detector 212 and the lens controller 240 are an example of a rate detector. The drive mechanism 211 is an example of a zoom lens driver. The flash memory 242 is an example of a storage unit. The lens controller 240 is an example of a controller. The CCD image sensor 110 and the AD converter 111 are an example of an imaging unit. The camera controller 140 is an example of a recording unit. The memory card 171 is an example of a recording medium.

1-3. Zoom Tracking Operation in Manual Zoom

Figure 5:
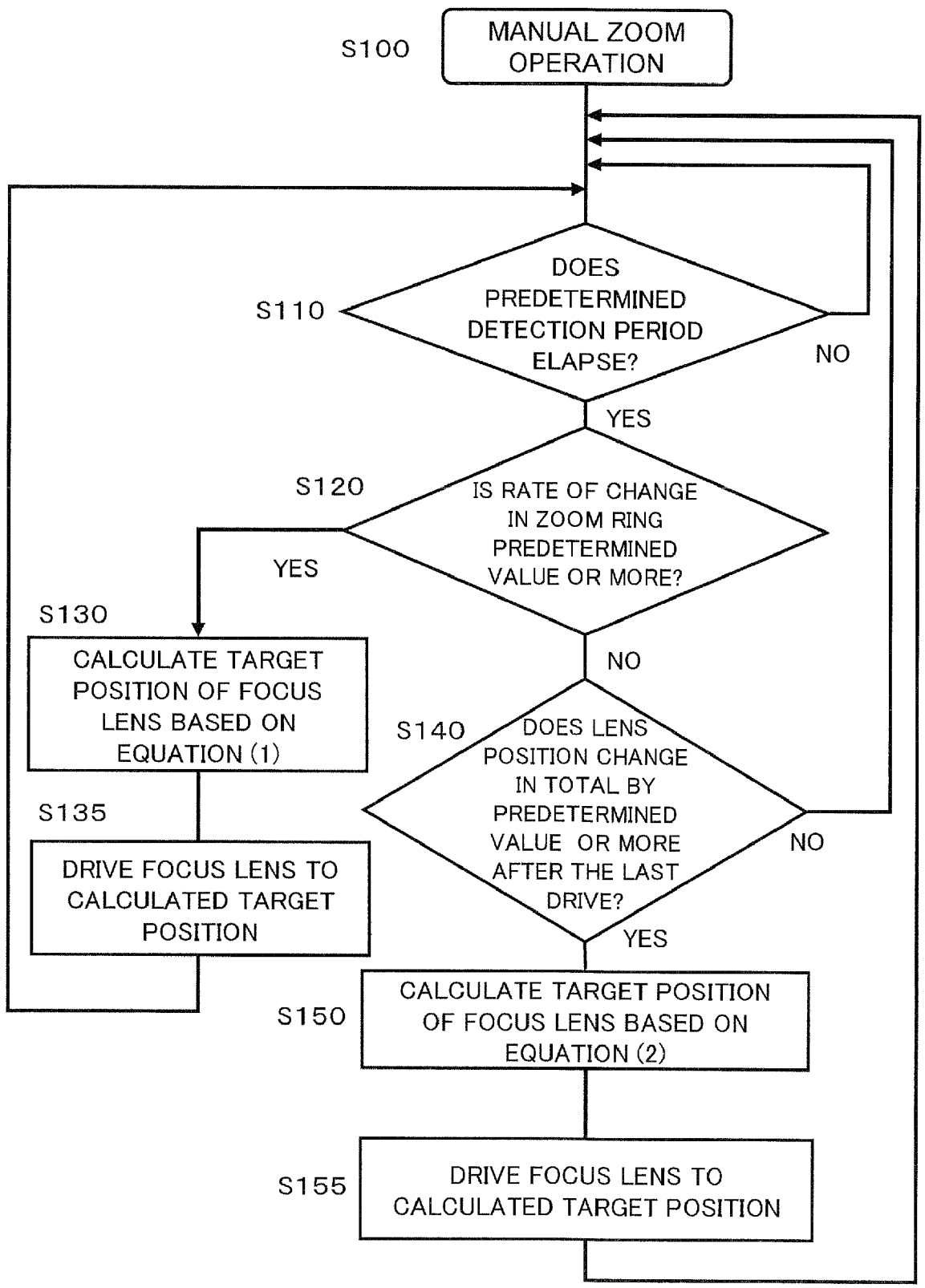
FIG. 5 is a flowchart showing a zoom tracking operation.

A zoom tracking operation conducted when a manual zoom operation is made by the user will be described with reference to FIGS. 5 and 6A and 6B. FIG. 5 is a flowchart for describing a zoom tracking operation conducted when a manual zoom operation is made. FIGS. 6A and 6B are schematic diagrams for describing the drive of the focus lens 230 conducted when a manual zoom operation is made.

The user can perform a manual zoom operation by turning the zoom ring 213. The interchangeable lens (lens barrel) 200 according to the present embodiment mechanically drives the zoom lens 210. Thus, when a manual zoom operation is done by the user with the zoom ring 213, the zoom lens 210 is driven in response to the operation by the user. When a manual zoom operation is done (S100), the lens controller 240 inputs, as an input, information about the position of the zoom ring 213 from the detector 212 every predetermined detection period (in the present embodiment, the length of the detection period is 4 ms) to determine an amount of turn of the zoom ring 213, and then determines whether the amount of turn is changed by an amount greater than or equal to a predetermined value (4 AD in this example) (S110 and S120).

If it is determined that the amount of turn of the zoom ring 213 is greater than or equal to the predetermined value (4 AD), the lens controller 240 calculates a target position of the focus lens 230 based on the following equation (1) (S130). Specifically, the target position of the focus lens 230 is calculated in the following manner.

First, an increase Δd in the position of the zoom lens is obtained based on the equation (1).

$$\Delta d = \alpha + \beta \times (\Delta P)(AD) \quad (1)$$

In the equation (1), α is a constant and is set to 4(AD), for example, which is equal to the predetermined value of the amount of turn of the zoom ring 213. β is a coefficient and is set to 8, for example. α and β are appropriately determined through an experiment, or the like. ΔP is the amount of change (amount of turn) in the zoom ring position. It is assumed that the direction from a wide-angle end to a telephoto end of the lens is a positive direction. When ΔP is negative, an increase Δd in the zoom lens position is determined by the following equation.

$$\Delta d = -\alpha + \beta \times (\Delta P)(AD) \quad (1a)$$

Then, a corrected position of the zoom lens is determined by the following equation (1.1):

Corrected position of zoom lens=currently detected position of zoom lens+d(AD)    (1.1)

Thereafter, a position of the focus lens corresponding to the corrected position of the zoom lens is determined based on a zoom tracking curve shown in FIG. 4 and the determined position is used as a target position of the focus lens 230.

When the target position of the focus lens 230 is calculated, the lens controller 240 controls the focus motor 233 to move the focus lens 230 to the target position (S135).

When the zoom lens 210 is stopped, as shown in FIG. 6A, the focus lens 230 moves to a position corresponding to the current zoom lens position. On the other hand, when the zoom lens 210 is driven by a manual zoom operation by the user, as shown in FIG. 6B, the focus lens 230 begins to move with a target position set to a focus position of the focus lens corresponding to a position distant from the current zoom lens position by the amount Δd calculated based on equation (1). For example, when α=4, β=8, and the amount of turn (amount of change) of the zoom ring 213 is 8 AD, the increase Δd is calculated to 68 (=4+8×8) (AD) from the equation (1). Thus, the driving of the focus lens 230 is started with a target position set to a focus position of the focus lens 230 corresponding to a position of the zoom lens 210 distant from the current position of the zoom lens 210 by 68 (AD) on the zoom tracking curve.

In this manner, when it is determined at step S120 that the zoom ring position is changed by an amount greater than or equal to the predetermined value (4 AD), the lens controller 240 calculates a target position to which the focus lens 230 is moved, based on equation (1). The target position is set to a position more distant from the current position of the zoom lens 210 as the speed of a turn operation of the zoom ring 213 is higher. In other words, as the speed of a turn operation of the zoom ring 213 is higher, the focus lens 230 is driven to a focus position of the focus lens 230 corresponding to a position more distant from the current position of the zoom lens 210. Therefore, the target position of the focus lens 230 can be changed according to the turn speed of the zoom ring 213, that is, the change rate of the zoom ring position. As a result, even when the zoom lens 210 is changed at high speed, the focus lens 230 can be controlled to move to a more appropriate position along the zoom tracking curve so that accurate zoom tracking can be achieved according to the turn speed of the zoom ring 213.

In this manner, while the zoom ring 213 is operated to turn, the focus lens 230 is driven with a target position set to a focus position of the focus lens 230 corresponding to a position distant by a predetermined amount from the current position of the zoom lens 210. However, when the operation of turning the zoom ring 213 is stopped, the focus lens 230 is not driven to a position exceeding a focus position of the focus lens 230 corresponding to a stop position of the zoom lens 210. This is because if the focus lens 230 is driven to a focus position of the focus lens 230 corresponding to a position distant from the stop position of the zoom lens 210 despite the stop of turning the zoom ring 213, then an image captured by the CCD image sensor 110 goes out of focus. Therefore, although driving of the focus lens 230 starts with a target position set to a focus position of the focus lens 230 corresponding to a position distant from the current position of the zoom lens 210, the focus lens 230 does not overpass a focus position of the focus lens 230 corresponding to a position of the zoom lens 210 at the time.

The case will be described in which it is determined at step S120 that the zoom ring 213 has not turned by an amount greater than or equal to the predetermined value (4 AD). In this case, the lens controller 240 determines whether the zoom ring 213 has turned in total by an amount greater than or equal to the predetermined value (4 AD) after the last drive of the focus lens 230 during the zoom tracking operation (S140).

If it is determined that the zoom ring 213 has not turned in total by an amount greater than or equal to the predetermined value (4 AD) after the last drive of the focus lens 230 during the zoom tracking operation, then the lens controller 240 returns to step S110.

If it is determined that the zoom ring 213 has turned in total by an amount greater than or equal to the predetermined value (4 AD) after the last drive of the focus lens 230 during the zoom tracking operation, then the lens controller 240 calculates a target position to which the focus lens 230 is moved, based on the following equation (2) (S150). Specifically, a target position of the focus lens 230 is calculated in the following manner.

First, an increase $\Delta d$ in the position of the zoom lens 210 is determined based on the equation (2).

$$\Delta d = \alpha + \beta \times (\alpha/N+1)(AD) \ (\Delta d > 0) \quad (2)$$

In the equation, $\alpha$ is a constant and is set to 4(AD), for example, which is equal to the predetermined value of the amount of turn of the zoom ring 213. $\beta$ is a coefficient and is set to 8, for example. $\alpha$ and $\beta$ are appropriately set based on an experiment, or the like. N is the number of detection periods during which the amount of change in the position of the zoom lens 210 has not exceeded the predetermined value.

Then, a corrected position of the zoom lens 210 is determined by the following equation (2.1).

Corrected position of zoom lens=detected current position of zoom lens+$\Delta d(AD)$ (2.1)

When it is determined that the zoom ring 213 has turned in total by an amount greater than or equal to the predetermined value (4 AD) in a negative direction after the last drive of the focus lens 230 during the zoom tracking operation, a corrected position of the zoom lens 210 is determined by the following equation.

Corrected position of zoom lens=detected current position of zoom lens−$\Delta d(AD)$ (2.1a)

Thereafter, the focus lens position corresponding to the corrected position of the zoom lens 210 is determined based on a zoom tracking curve shown in FIG. 4 and the determined position is used as a target position of the focus lens 230. When the target position is calculated, the lens controller 240 controls the focus motor 233 to move the focus lens 230 toward the target position (S155).

As described above, when it is determined at step S140 that the amount of change in total is greater than or equal to the predetermined value (4 AD), the lens controller 240 calculates the target position to which the focus lens 230 is moved, based on the equation (2). This arrangement allows the focus motor 233 to drive the focus lens 230 with a target position set to a focus position of the focus lens 230 corresponding to a position of the zoom lens 210 distant from the current position of the zoom lens 210, even if a turn operation performed on the zoom ring 213 has a relatively low speed. Thus, the camera system 1 according to the present embodiment can provide highly accurate zoom tracking, even when a turn operation of the zoom ring 213 is performed at low speed. As a result, the camera system 1 according to the present embodiment can achieve relatively accurate zoom tracking according to the turn speed of the zoom ring 213.

Although in the camera system 1 according to the present embodiment the drive of the focus lens 230 is changed according to the turn speed of the zoom ring 213, the configuration does not necessarily need to be the one described above. For example, the drive of the focus lens 230 may be changed according to the change rate of the position of the zoom lens 210. In short, it may be configured that information about change rate of the zoom lens position is outputted and the drive of the focus lens is controlled according to the output.

1-4. Summary of Present Embodiment

A lens barrel according to the present embodiment includes the focus lens 230 which is movable along the optical axis to perform zoom tracking, the focus motor 233 that drives the focus lens 230, the zoom lens 210, the zoom ring 213 that is turned by a user, the zoom lens drive mechanism 211 that mechanistically moves the zoom lens 210 according to the amount of turn of the zoom ring 213, the slider 300 and resistor 310 (or the detector 212) that detect a position of the zoom lens 210, the detector 212 and lens controller 240 that detect a change rate of the zoom lens position, the flash memory 242 that stores relational information associating a position of the zoom lens 210 with a focus position of the focus lens 230, and the lens controller 240 that controls the focus motor 233. The lens controller 240 determines, by referring to the relational information, a focus position of the focus lens 230 corresponding to a position of the zoom lens 210 distant by a predetermined amount from the position of the zoom lens 210 detected by the slider 300 and the resistor 310, and controls the focus motor 233 to drive the focus lens 230 with a target position set to the determined focus position. The lens controller 240 changes the predetermined amount according to the change rate of the zoom lens position detected by the detector 212 and lens controller 240.

This configuration allows the focus motor 233 to drive the focus lens 230 with a target position set to a focus position of the focus lens 230 corresponding to a position more distant from the current position of the zoom lens 210 as the speed of a turn operation performed on the zoom ring 213 is higher. As a result, independent of the turn speed of the zoom ring 213, deviation can be reduced between a focus lens position at the time drive of the focus lens 230 ends and a focus lens position on a zoom tracking curve corresponding to a new position of the zoom lens 210 at the time the drive of the focus lens 230 ends. Hence, focus control which is accurate and independent of the turn speed of the zoom ring 213 can be achieved.

In the lens barrel according to the present embodiment, the lens controller 240 varies an equation used to calculate the predetermined amount with the change rate of the zoom lens.

Accordingly, the lens controller 240 drives the focus lens 230 with a target position set to a focus position of the focus lens 230 corresponding to a position more distant from the current position of the zoom lens 210 as the speed of a turn operation performed on the zoom ring 213 is higher. As a result, the camera system 1 according to the present embodiment can achieve relatively rapid focus control according to the turn speed of the zoom ring 213.

According to zoom tracking according to the present embodiment, even when the user changes a zoom magnification by operating the zoom ring 213 at a desired speed, a focus state can be kept. Therefore, the zoom tracking according to the present embodiment is particularly effective for shooting a moving image.

2. Other Embodiments

The first embodiment is described above. The embodiment is, however, not limited to that described above. Other embodiments will be described below.

The formation, value of constant and so on in the equations (1) and (1a) shown in the first embodiment are an example and, needless to say, other equations can be used as long as it is an equation by which an increase Δd that changes according to the change rate of the zoom lens position can be determined. Similarly, the formation, value of constant and so on in the equation (2) are an example and other equations can be used as long as it is an equation by which an increase Δd that slowly changes according to the zoom lens position which changes at low speed can be determined.

In the first embodiment, the equations (1) and (1a) may be further made to vary with the position of the zoom lens 210. For example, the constant α and the coefficient β may be made to vary with the position of the zoom lens 210 such that Δd more greatly changes when the zoom lens 210 is at a wide-angle end while Δd does not change much when the zoom lens 210 is at a telephoto end. The same also applies to the equation (2).

Although in the first embodiment a target position of the focus lens 230 in a zoom tracking operation is determined on the side of the interchangeable lens 200 based on a change rate of the position of the zoom lens 210 and the relational information, the target position may be determined on the side of the camera body 100. In that case, the camera controller 140 receives in advance the relational information from the lens controller 240. Then, during a manual zoom operation, the camera controller 140 periodically receives at least information about the position of the zoom lens 210 from the lens controller 240, determines a target position of the focus lens 230 in the aforementioned method by referring to the received positional information, the relational information, and the like, and sends information about the determined target position to the lens controller 240.

Although in the first embodiment the interchangeable lens 200 includes the flash memory 242, the interchangeable lens 200 may include a ROM which is not writable instead of the flash memory 242.

Moreover, although in the first embodiment the zoom tracking is achieved by driving the focus lens 230, the focus lens 230 does not necessarily need to be used for the zoom tracking. For example, a correction lens dedicated to the zoom tracking may be additionally provided and the zoom tracking may be performed by driving the correction lens.

Although in the first embodiment the camera body 100 including no movable mirror is exemplified, the configuration of the camera body 100 is not limited thereto. For example, a movable mirror may be provided in the camera body 100 or a prism for splitting a subject image may be provided in the camera body 100. Alternatively, a movable mirror may be provided not in the came body 100 but in an adapter.

Although in the first embodiment the CCD image sensor 110 is exemplified as an imaging device, the imaging device is not limited thereto. For example, the imaging device may be a CMOS image sensor or NMOS image sensor.

Moreover, although in the first embodiment the configuration in which a voltage of 3 V is applied across the resistor 310 is exemplified, the applied voltage is not limited to 3 V but may be 1 V or 5 V. That is, any voltage may be applied in accordance with application.

Although in the first embodiment the detection period of the amount of turn of the zoom ring 213 is 4 msec, the detection period is not limited thereto. For example, the detection period may be 2 msec, 8 msec, or 5 msec.

INDUSTRIAL APPLICABILITY

The present embodiment can be applied to a lens barrel used in a digital still camera, and the like.

Although the specified embodiment has been described as above, many other modifications, corrections and applications are apparent to those skilled in the art. Therefore, the present embodiment is not limited by the disclosure provided herein.

What is claimed is:

1. A lens barrel comprising:
a correction lens operable to move along an optical axis to perform zoom tracking;
a correction lens driver operable to drive the correction lens;
a zoom lens;
a zoom ring operable to be turned by a user;
a zoom lens driver operable to mechanically move the zoom lens according to an amount of turn of the zoom ring;
a position detector operable to detect a position of the zoom lens;
a rate detector operable to detect a change rate of the position of the zoom lens;
a storage unit operable to store relational information which associates the position of the zoom lens with a focus position of the correction lens; and
a controller operable to control the correction lens driver, wherein
the controller determines a focus position of the correction lens corresponding to a position more distant by a predetermined amount from the position of the zoom lens detected by the position detector, by referring to the relational information, and controls the correction lens driver to drive the correction lens with a target position set to the determined focus position, and
the controller changes the predetermined amount according to the change rate of the position of the zoom lens detected by the rate detector.

2. The lens barrel according to claim 1, wherein the controller varies an equation used to calculate the predetermined amount with the change rate of the position of the zoom lens.

3. The lens barrel according to claim 2, wherein the controller further varies the equation with the position of the zoom lens.

4. The lens barrel according to claim 1, wherein the correction lens is a focus lens.

5. The lens barrel according to claim 1, wherein the correction lens is a lens different from a focus lens.

6. An imaging apparatus comprising an interchangeable lens and a camera body to which the interchangeable lens is mountable, wherein
the interchangeable lens includes:
a correction lens operable to move along an optical axis to perform zoom tracking;
a correction lens driver operable to drive the correction lens;
a zoom lens;
a zoom ring operable to be turned by a user;

a zoom lens driver operable to mechanically move the zoom lens according to an amount of turn of the zoom ring;

a position detector operable to detect a position of the zoom lens;

a rate detector operable to detect a change rate of the position of the zoom lens;

a storage unit operable to store relational information which associates the position of the zoom lens with a focus position of the correction lens; and a controller operable to control the correction lens driver, the controller determines a focus position of the correction lens corresponding to a position more distant by a predetermined amount from the position of the zoom lens detected by the position detector, by referring to the relational information, and controls the correction lens driver to drive the correction lens with a target position set to the determined focus position, and the controller changes the predetermined amount according to the change rate of the position of the zoom lens detected by the rate detector, the camera body includes:

an imaging unit operable to generate image data of a subject image captured through the interchangeable lens; and a recording unit operable to perform a predetermined process on the image data and store the image subjected to the predetermined process in a recording medium.

7. The imaging apparatus according to claim 6, wherein the controller varies an equation used to calculate the predetermined amount with the change rate of the position of the zoom lens.

8. The imaging apparatus according to claim 7, wherein the controller further varies the equation with the position of the zoom lens.

9. The imaging apparatus according to claim 6, wherein the correction lens is a focus lens.

10. The imaging apparatus according to claim 6, wherein the correction lens is a lens different from a focus lens.

11. An imaging apparatus comprising:

a correction lens operable to move along an optical axis for zoom tracking;

a correction lens driver operable to drive the correction lens;

a controller operable to control the correction lens driver;

a zoom lens;

a zoom ring operable to be turned by a user;

a zoom lens driver operable to mechanically move the zoom lens according to an amount of turn of the zoom ring;

a position detector operable to detect a position of the zoom lens;

a rate detector operable to detect a change rate of the position of the zoom lens;

a storage unit operable to store relational information which associates the position of the zoom lens with a focus position of the correction lens;

an imaging unit operable to generate image data of a subject image captured through an optical system including the correction lens and the zoom lens; and a recording unit operable to perform a predetermined process on the image data and store the image subjected to the predetermined process in a recording medium, wherein the controller determines a focus position of the correction lens corresponding to a position more distant by a predetermined amount from the position of the zoom lens detected by the position detector, by referring to the relational information, and controls the correction lens driver to drive the correction lens with a target position set to the determined focus position, and the controller changes the predetermined amount according to the change rate of the position of the zoom lens detected by the rate detector.

12. The imaging apparatus according to claim 11, wherein the controller varies an equation used to calculate the predetermined amount with the change rate of the position of the zoom lens.

13. The imaging apparatus according to claim 12, wherein the controller further varies the equation with the position of the zoom lens.

14. The imaging apparatus according to claim 11, wherein the correction lens is a focus lens.

15. The imaging apparatus according to claim 11, wherein the correction lens is a lens different from a focus lens.

* * * * *